United States Patent [19]
Freeman, Jr.

[11] 3,713,211
[45] Jan. 30, 1973

[54] METHOD OF FABRICATING A SUPERCONDUCTING MAGNET

[75] Inventor: Donald C. Freeman, Jr., Indianapolis, Ind.

[73] Assignee: Union Carbide Corporation, New York, N.Y.

[22] Filed: May 3, 1971

[21] Appl. No.: 139,886

Related U.S. Application Data

[60] Continuation of Ser. No. 798,510, Oct. 22, 1968, which is a division of Ser. No. 729,836, Feb. 21, 1968, Pat. No. 3,440,585, which is a continuation-in-part of Ser. No. 613,682, Feb. 2, 1967, which is a continuation of Ser. No. 455,807, May 14, 1965, abandoned.

[52] U.S. Cl. ............... 29/599, 29/194, 29/420, 117/45, 117/105, 174/DIG. 6, 335/216
[51] Int. Cl. ............................................. H01v 11/00
[58] Field of Search .......... 29/599, 194, 527.2, 527.4, 29/420; 117/45, 71 M, 105, 217; 174/126 CP, DIG. 6; 335/216

[56] References Cited

UNITED STATES PATENTS

| | | | |
|---|---|---|---|
| 3,025,182 | 3/1962 | Schrewelius | 117/105 |
| 3,056,889 | 10/1962 | Nyberg | 335/216 X |
| 3,205,413 | 9/1965 | Anderson | 335/216 |
| 3,205,461 | 9/1965 | Anderson | 335/216 X |
| 3,214,249 | 10/1965 | Bean et al. | 174/DIG. 6 |
| 3,283,217 | 11/1966 | Cherry | 317/123 |
| 3,227,930 | 1/1966 | Hnilicka | 335/216 |
| 3,281,738 | 10/1966 | Hanak | 335/216 |
| 3,440,585 | 4/1969 | Freeman | 335/216 |
| 3,436,248 | 4/1969 | Dittrich et al. | 117/105 |
| 3,486,146 | 12/1969 | Williams | 335/216 |

*Primary Examiner*—John F. Campbell
*Assistant Examiner*—Donald C. Reiley, III
*Attorney*—Paul A. Rose, Thomas I. O'Brien, Dominic J. Terminello, John C. Le Fever and Eugene Lieberstein

[57] ABSTRACT

This invention relates to a superconducting magnet formed of layers of serially connected helices of superconducting material on non-superconducting substrates. Each superconducting layer is deposited upon a non-superconducting layer in a manner such that alternate ends form superconducting joints. The superconducting materials are microscopic platelets of metallic particles bonded to each other and to the non-superconducting substrate.

9 Claims, 19 Drawing Figures

PLATE SUPERCONDUCTOR (NIOBIUM TIN)
ON COPPER TUBE

CUT SPIRAL GROOVE
IN SUPERCONDUCTOR

PLATE ALUMINA ON
SUPERCONDUCTOR

PLATE COPPER
ON ALUMINA

INVENTOR.
DONALD C. FREEMAN JR

ATTORNEY

INVENTOR.
DONALD C. FREEMAN, JR.

ATTORNEY

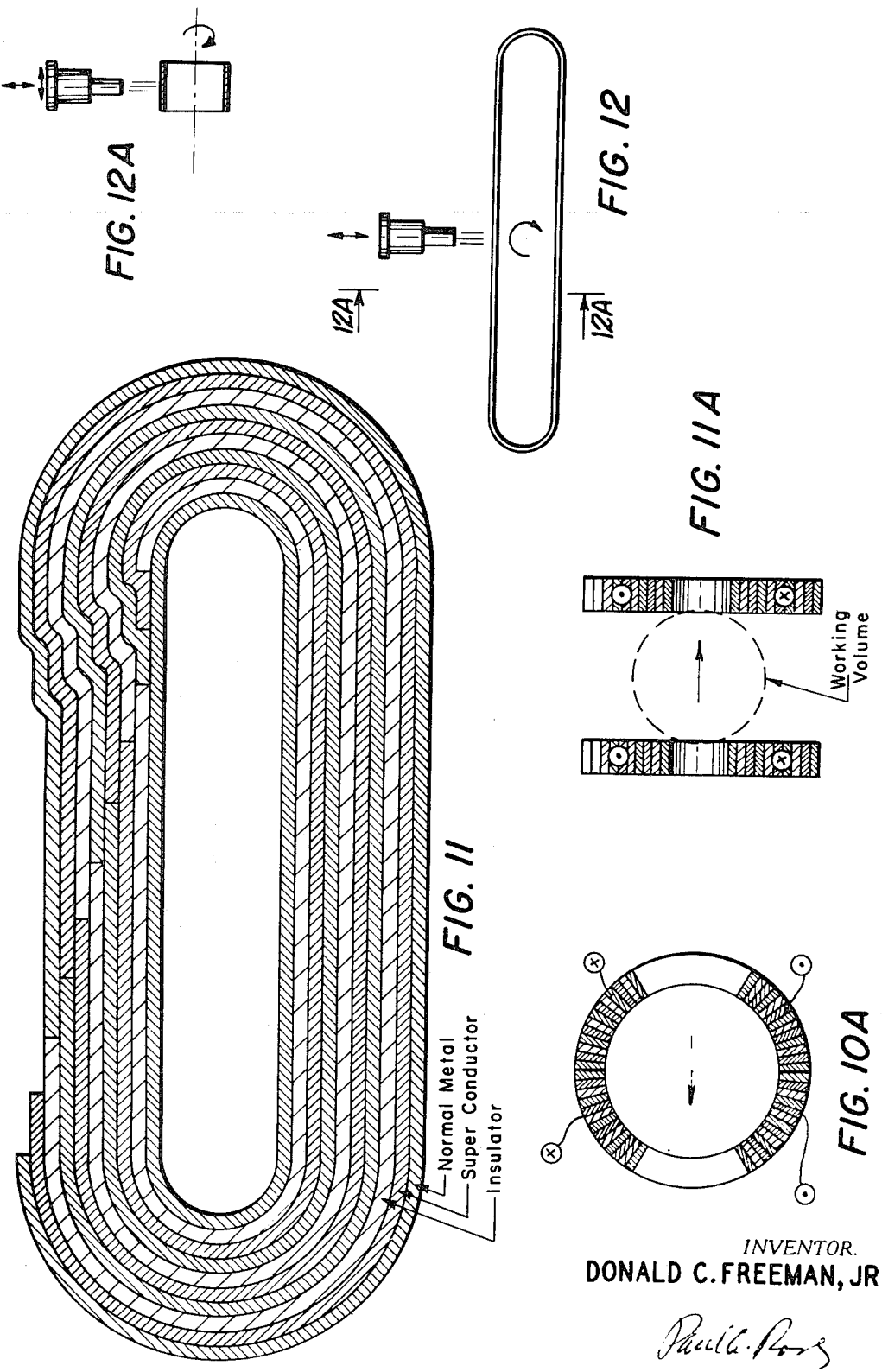

METHOD OF FABRICATING A SUPERCONDUCTING MAGNET

This application is a continuation of application Serial No. 798,510 which application is a division of application Serial No. 729,836, filed February 21, 1968, now Patent No. 3,440,585, which application is in turn a continuation-in-part of application Serial No. 613,682 filed February 2, 1967, which application is in turn a continuation of application Serial No. 455,807, filed May 14, 1965 and now abandoned.

This invention relates to superconducting magnets and to a method for fabricating superconducting magnets. More particularly, this invention relates to superconducting magnets fabricated from suitable metallic powders.

Until this invention, known practical superconducting magnets have been made by winding wire or tape into an inductive configuration. Even relatively small wire or tape wound magnets require substantial lengths of conductor, sometimes kilometers of conductor. Because of the complexities involved in fabricating fine superconducting wires and tapes in such lengths, the cost of producing large wound magnets is high and it is often difficult to fabricate such magnets free of electrical shorts arising from defects in the conductor in combination with the large compressive forces in the interior of the winding due to accumulated winding tension. Furthermore, it is difficult to achieve high packing factors in large wound magnets and consequently the superconducting material is not utilized efficiently.

A principal object of this invention is to provide superconducting magnets having superconductive components of any desired cross-sectional area in almost any geometrical shape. Another object is to provide superconducting magnets with a high current density and high packing factor. Still another object is to provide superconducting magnets having a high intrinsic structural strength so as to efficiently withstand the disruptive influence of magnetic forces.

These and other objects and advantages will become apparent from the following description and the accompanying drawings, of which:

FIG. 10a is a cross-section of the saddle coil taken along the lines 10–10a of FIG. 10;

FIG. 11 is a front elevation of a race track type coil configuration fabricated in accordance with this invention;

FIG. 11a shows a pair of race track coils abutting a cylindrical working volume; and FIGS. 12 and 12a illustrate the procedure which may be employed for fabricating a race track type coil in accordance with this invention where FIG. 12a is a cross-sectional view taken along the lines 12a–12a of FIG. 12.

Figure 1:
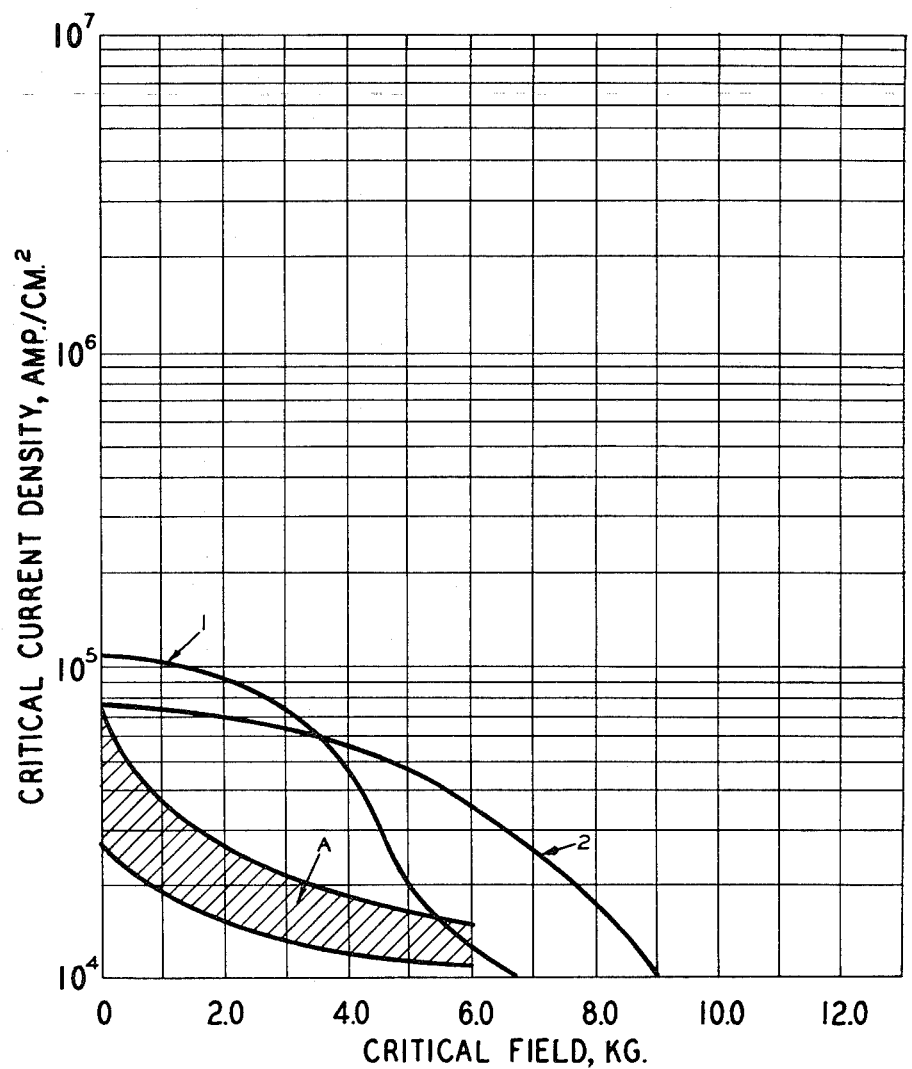
FIGS. 1–6 show curves plotting critical current density vs. magnetic field which exemplify the superconducting properties of magnets fabricated in accordance with this invention.

A superconducting magnet fabricated according to this invention comprises superimposed layers containing superconducting material alternating with layers containing non-superconducting material. The superconducting layers each comprise a structure of microscopic particles bonded into interlocking relation with one another with the interface between bonded particles forming a continuous matrix of metallic material having superconducting properties. The adjacent superconducting layers are electrically bonded together at one boundary and the intervening non-superconducting layers completely physically separate the adjacent superconducting layers except at the bonded interconnection.

According to this invention, superconducting layers may be formed by introducing a suitable powdered metallic material into a high velocity, high temperature gas stream to produce a high velocity stream of heated particles which are at least partially molten and directing this high velocity stream against the surface of a suitable base (in the case of the first layer so-deposited) or against the surface of one of the non-superconducting layers (in the case of subsequent layers so deposited) thereby depositing the so-heated particles on the base in the form of a cylinder. The layers thus formed may then be machined to produce a helical thread-like configuration. The superconducting layers may be heat-treated at a suitable temperature for a suitable period of time to enhance the formation of a superconducting interfacial matrix between the bonded particles.

Suitable metallic powders include metals or metal alloys which have superconductive properties or which combine to form an alloy having superconductive properties. Typical metals, which are listed herein by way of a non-limiting example, include niobium, tin, zirconium, aluminum, vanadium, silicon. Niobium is superconducting in its pure form, when present in alloys such as the intermetallic compound of niobium tin ($Nb_3Sn$) and niobium aluminum ($Nb_3Al$), and also when present in alloys such as the solid solution of niobium and zirconium. Vanadium is superconducting when present in alloys such as the intermetallic compound of vanadium silicide ($V_3Si$).

The optimum powder size is that which permits the particles to be softened enough to give good adherence but does not permit excessive vaporization of the particles. Generally, materials of lower melting point may be of larger particle size, up to 150 microns for example, and those materials of higher melting point may be smaller than about 50 microns. However, these size limits are not critical.

The process by which the high temperature, high velocity gas stream is produced must be capable of transferring a sufficient amount of energy to the powder to be deposited to insure the formation of a sound, dense, adherent layer on the surface of the base material.

A preferred process is to strike an electric arc between two electrodes and pass a gas stream into the arc to produce a high thermal content plasma. The powder is introduced into this plasma to heat and propel the powder onto a base. It is further preferred that a portion of the arc and at least some of the gas be passed through an orifice to constrict the arc so as to produce an intense columnar arc-containing plasma. It is also preferred that the process employ a non-transferred arc wherein the base is not in the electrical circuit.

Another process that may be employed is to detonate a fuel charge in a confined chamber and simultaneously introduce the powder into the chamber in such manner that the powder particles are heated and propelled from the chamber by the detonation onto a base. This process could be employed, for example, in producing lamellar structures containing one of the superconducting niobium oxynitride compounds.

Many gases can be employed in this process depending upon the type of material being deposited. Relatively pure coatings may be achieved by employing an atmosphere inert both to the coating material and the base, such as argon, helium, and in some circumstances, nitrogen and hydrogen. Mixtures of gases, such as argon-nitrogen and argon-hydrogen, can also be employed. The advantage of employing an arc to transfer thermal energy to the powder is that the chemistry of the ambient atmosphere can be controlled without basically affecting the energy available for heating the coating material.

A suitable base material upon which heated particles may be deposited can be any material to which the particles will adhere. For certain devices, the base material will preferably be removed by, for example, dissolution and for such devices the base material must be soluble in a solvent that will not attack the coating. The base material to which the coating of this invention is to be applied may be of any material which is solid and chemically stable at application temperatures. During the application of the coating of this invention the temperature of the base material may be raised to as high as approximately 600°F. Therefore, to prevent alloying of the coating and base materials, the base material would have to be a solid having a melting point higher than approximately 600°F. External cooling during deposition, or internal cooling if the base is hollow, can be used to maintain the base at a suitably low temperature in which case a lower melting point material might be used.

In order to insure that a metallic material will carry a superconductive current when cooled below its transition temperature, the internal structure of the superconductor must contain a continuous path of superconducting material. If grain boundary film or gross inclusions are present to a significant degree, the superconductive electrical continuity will be disrupted. The electric arc plating process referred to above produces a pure layer or coating, or at least the distribution of impurities is such that the electrical continuity is not appreciably affected, and for this reason the arc plating process is the preferred process for producing superconducting devices of this invention.

Powdered metallic materials such as described above can be introduced into the high velocity, high temperature gas stream in elemental form such that each of the microscopic particles of the thus-formed structure will be constituted of elemental material randomly dispersed within the coating structure. Alternatively, elemental powdered materials can be pre-reacted to form an alloyed powdered material prior to introduction into the gas stream such that the thus-formed microscopic leaves of the lamellar structure will be constituted of alloyed material. An alloyed powdered material is obtained by blending elemental powders, sintering or reacting the blended powders, and then milling the product. When either elemental or pre-reacted powders are used, the continuous matrix formed at the interface of the bonded and interlocking particles will provide the principal superconducting current path.

Use of an elemental powder blend is preferred because superior superconducting performance is more easily obtained than when pre-reacted powders are used. The reasons for this superiority are not fully understood but such superiority is believed to be attributable to a better distribution of existing impurities in the powder. With pre-reacted powders, the original surface film on each elemental particle would be diffused into, or perhaps trapped at interfaces within the resulting alloyed powder particles during the reaction. Comminution of the reacted product to form new alloyed powder provides new surfaces which become contaminated by a surface film. During deposition of the pre-reacted powders to form the structure, the latter surface film would be disrupted by particle surface melting as adjacent articles are bonded together, but internal impurities from the original surface film would likely be unaffected and probably impede formation of the necessary continuous network of interfacial filaments. However, by comminution of the pre-reacted powder to very fine particles, more complete particles reaction could be promoted during deposition thereby better disrupting the internal surface film impurities and providing improved superconducting performance.

The superconducting performance of the deposited layer or coating can be markedly improved by heat treatment. Furthermore, if the as-deposited coating is not appreciably superconducting, for example as might occur when elemental vanadium and silicon powders are deposited under conditions resulting in little or no formation of the superconducting intermetallic compount $V_3Si$ at the particle interfaces, heat treatment of the coating will result in the coating becoming a good superconductor. In general, heat treatment is a necessary procedure when an intermetallic compound is to be formed from elemental powders that either are not, or not significantly, superconductive because there appears to be insufficient reaction at the particle interfaces upon deposition to consistently achieve a continuous matrix of metallic material having superconducting properties. When either solid solution alloys or pure metal coatings are produced from elemental powders, heat treatment is not essential but is preferred.

Superconducting articles produced in accordance with the present invention can be formed in geometries and with dimensions unattainable by pressing powders. For example, long thin tubes can be made, and geometries having re-entrant configurations can be produced. Furthermore, the nonhomogeneous nature of the coating lamellar structures produced in accordance with this invention offers a distinct advantage in mechanical properties over pressed and sintered devices. In contrast to the latter, the coatings of this invention are strong and coherent, but nevertheless are easily machinable to any desired configuration prior to heat-treatment. After heat treatment such coatings may become more brittle and therefore more difficult to machine. Intermetallic compounds having a β-tungsten structure, for example, are so brittle as to preclude, from a practical standpoint, any machining whatsoever. Solid solution alloys such as NbZr or NbTi are machinable both before and after a heat treatment.

Table I lists representative data for several superconducting coatings prepared in accordance with this invention. The specimen listed are cylindrical approximately ¼-inch I.D. x ¾-inch long with wall thicknesses as listed in the table. The powder feed material was deposited by passage through the collimated plasma of a constricted arc onto brass or aluminum substrates. The substrates were then dissolved so that the specimen could be heat-treated as free-standing cylinders.

ance of intermetallic compound layers made from relatively non-superconducting constituents, such as $V_3Si$, and that heat treatment markedly improves the superconducting performance of intermetallic compound layers made from superconducting constituents, such as $Nb_3Al$ and $Nb_3Sn$.

The data in Table I further suggests that using unmixed or premixed elemental powders is preferable to using prereacted powder. As discussed previously, use of prereacted powder may introduce deleterious contaminants that reduces the superconducting performance of the coating.

FIGS. 1 to 6 show critical current density values obtained from hollow cylinder magnetization curves for a number of the specimens at 4.2°K listed in Table I, the curve numbers in the figures corresponding to the specimen numbers in the Table. The critical current density vs. magnetic field curves for structures produced by this invention shown in these figures are merely exemplary and do not depict the limits of behavior of materials produced in accordance with this invention.

Figure 2:
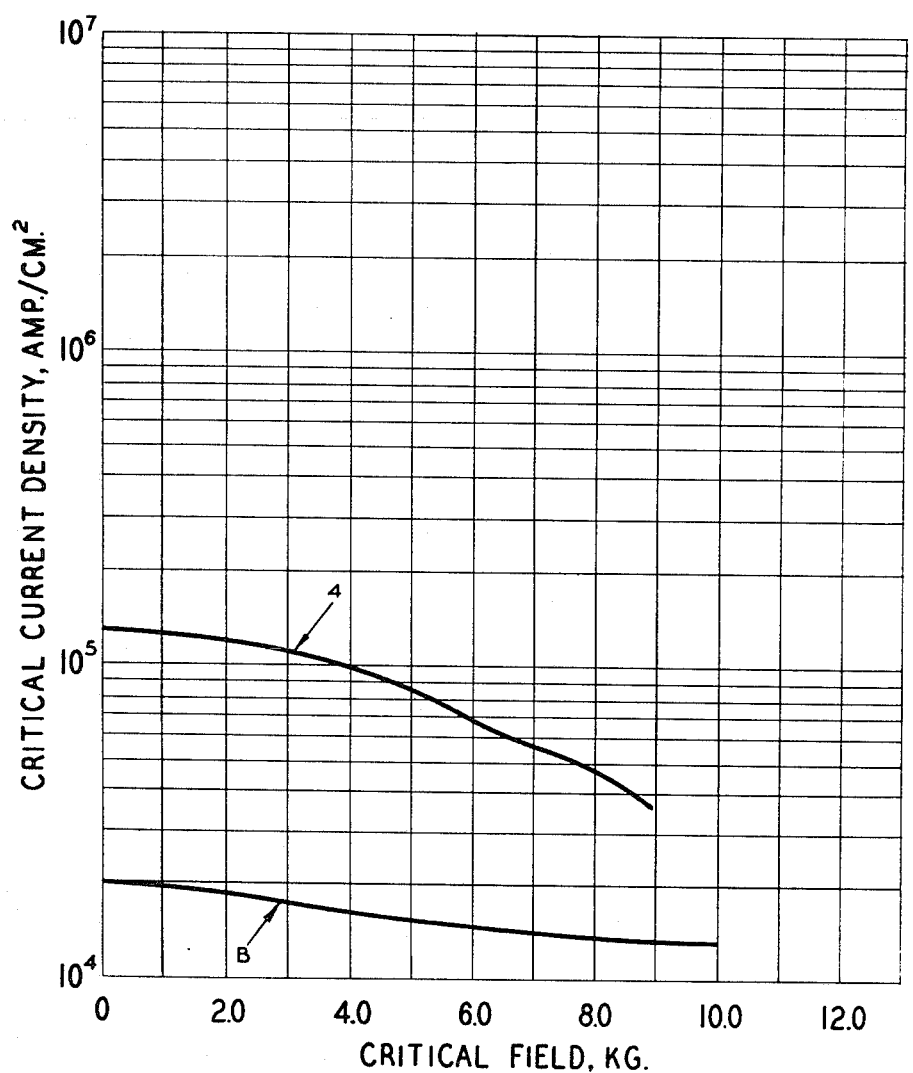

FIG. 1 shows the critical current behavior for a structure containing the pure metal, niobium, as deposited, curve 1, and after the heat treatment specified in Table I, curve 2, compared with typical behavior reported for pressed and sintered niobium cylinders, curve A. FIG. 2 shows the critical current

TABLE I

| Specimen | Powder condition [2] | Heat treatment | | Specimen, wall thickness, in. | Field [3] excluded, kg. | Field [3] trapped, kg. |
|---|---|---|---|---|---|---|
| | | Temp., C. | Time, hrs. | | | |
| 1 | Nb | None | None | 0.001 | 3.0 | 4.5 |
| 2 | Nb | 900 | 2 | 0.0205 | 3.0 | 3.5 |
| 3 | Nb-25% Zr | Premixed | None | None | 0.0205 | 2.5 | 4.4 |
| 4 | Nb-25% Zr | do | 900 | 2 | 0.024 | 4.0 | 6.8 |
| 5 [1] | $Nb_3Al$ | Prereacted | 900 | 1 | 0.11 | 0.1 | 0.2 |
| 6 | $Nb_3Al$ | do | None | None | 0.015 | 0 | 0.5 |
| 7 | $Nb_3Al$ | Premixed | 700 | 2 | 0.015 | 0.15 | 0 |
| 8 | $Nb_3Al$ | do | 900 | 2 | 0.015 | 3.0 | 5.2 |
| 9 | $Nb_3Al$ | do | 1,000 | 6 | 0.100 | 3.0 | 0.8 |
| 10 | $Nb_3Al$ | do | 500 | 3 | 0.100 | 6.6 | 6.6 |
| 11 [1] | $V_3Si$ | Prereacted | 900 | 1 | 0.095 | 0.2 | 0.6 |
| 12 | $V_3Si$ | do | None | None | 0.0105 | 0 | 0 |
| 13 | $V_3Si$ | do | 700 | 24 | 0.008 | 0.75 | 0.5 |
| 14 | $V_3Si$ | do | None | None | 0.028 | 0 | 0 |
| 15 | $V_3Si$ | do | 1,200 | 10 | 0.028 | 2.0 | 4.8 |
| 16 | $V_3Si$ | Unmixed | None | None | 0.030 | 0 | 0 |
| 17 | $V_3Si$ | do | 900 | 6 | 0.060 | 26.0 | |
| 18 | $V_3Si$ | Premixed | 1,000 | 6 | 0.060 | 24.68 | |
| 19 | $Nb_3Sn$ | Prereacted | 1,000 | 6 | 0.095 | 9.8 | 9.8 |
| 20 | $Nb_3Sn$ | do | None | None | 0.008 | 0 | 0 |
| 21 | $Nb_3Sn$ | do | 800 | 1 | 0.008 | 0.25 | 0.25 |
| 22 | $Nb_3Sn$ | Unmixed | None | None | 0.025 | 1.2 | 1.4 |
| 23 | $Nb_3Sn$ | do | 1,000 | 6 | 0.050 | 45.3 | 41.2 |
| 24 | $Nb_3Sn$ | do | 1,000 | 6 | 0.025 | 26.8 | 18.5 |
| 25 | $Nb_3Sn$ | Premixed | 1,000 | 6 | 0.050 | 44.7 | |
| 26 | NbZrSn | do | 800 | 2 | 0.100 | 10.0 | 9.0 |
| 27 | NbZrSn | do | 1,000 | 6 | 0.100 | 10.0 | 8.9 |
| 28 | NbZrSn | do | 1,000 | 6 | 0.100 | 18.7 | |

[1] Pressed and sintered cylinders.
[2] Powder condition: Premixed-elemental powders uniformly mixed but not reacted before fed into arc effluent. Unmixed-elemental powders separately but simultaneously fed into arc effluent. Prereacted-elemental powders mixed and reacted to form alloy and then ground to form alloy powder which was fed into arc effluent.
[3] These data obtained from hollow cylinder magnetization measurements.

There are three general groupings of specimen listed in Table I. Specimen 1 and 2 comprise elemental metal cylinders, specimen 3 and 4 comprise solid solution alloy cylinders, specimen 5 to 25 comprise β-tungsten intermetallic compound cylinders, and specimen 26 to 28 comprise ternary alloy cylinders. The flux trapping and flux shielding (exclusion) data in Table I suggest that both elemental and solid solution alloy layers would be superconducting whether or not heat-treated and that heat-treatment improves somewhat their superconducting performance. The data also suggest that heat treatment markedly improves the superconductng performbehavior for a structure containing the superconducting solid solution alloy, Nb-25 percent Zr, after the heat treatment specified in Table I, curve 4, compared with typical behavior reported for pressed and sintered Nb-25 percent Zr, cylinders, curve B.

Figure 3:
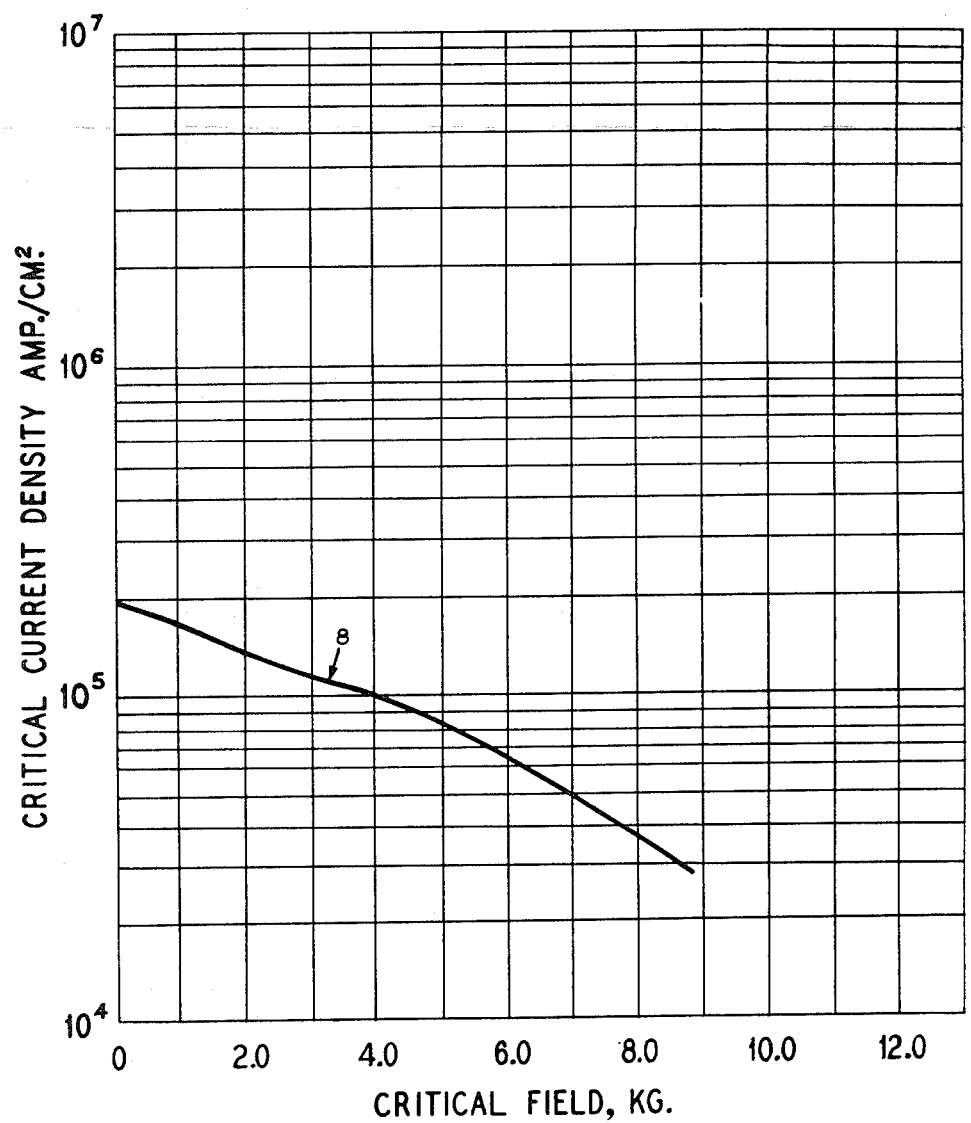
Figure 4:
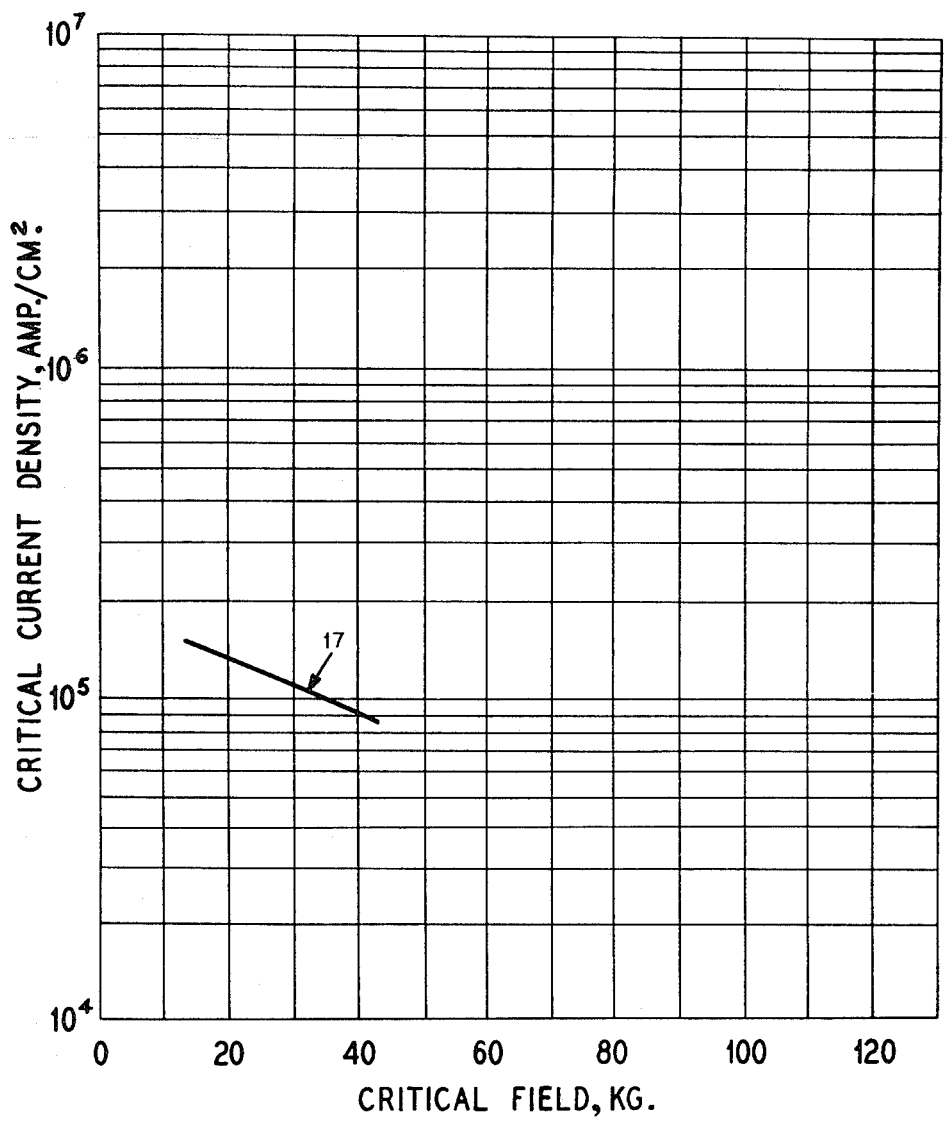

FIGS. 3 and 4 show the critical current behavior for structures containing, respectively, the superconducting β-tungsten intermetallic compounds of $Nb_3Al$ and $V_3Si$ after the heat treatments specified in Table I.

Figure 5:
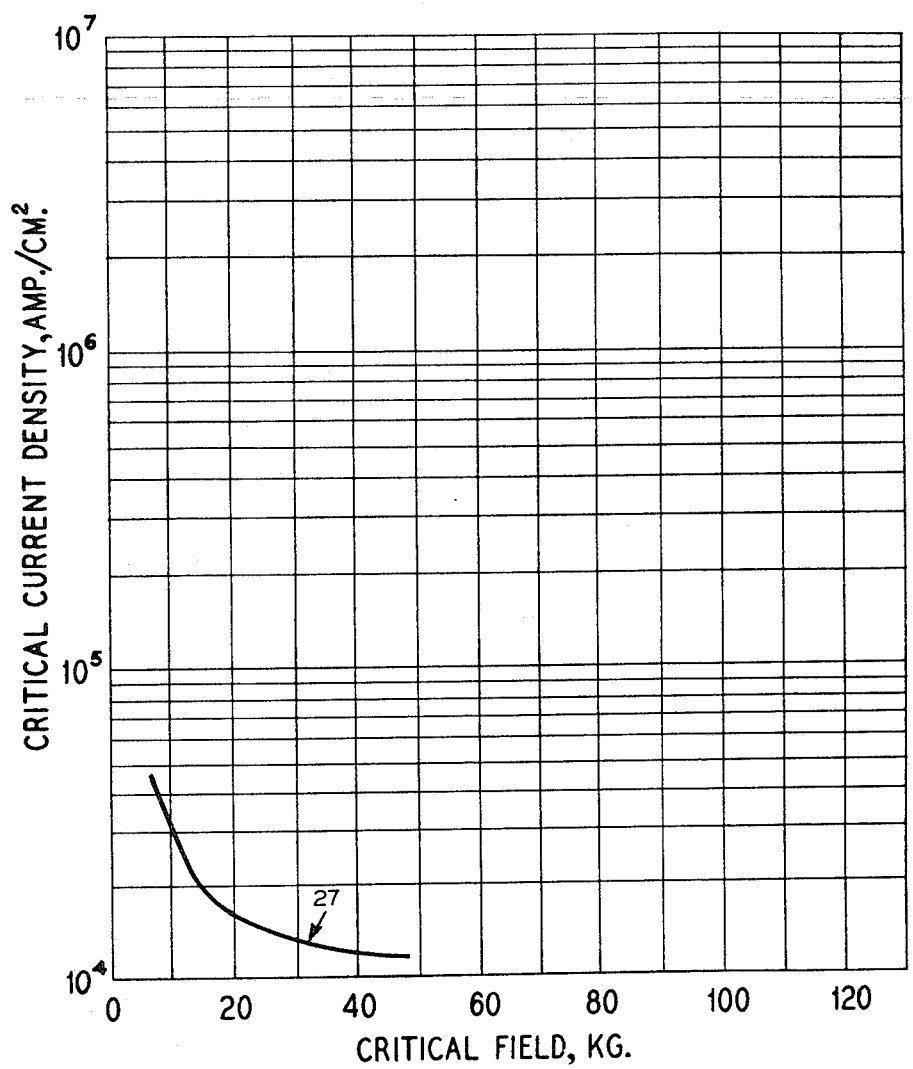

FIG. 5 shows the critical current behavior for a structure containing a superconducting alloy composed of NbZrSn after the heat treatment specified in Table I.

Figure 6:
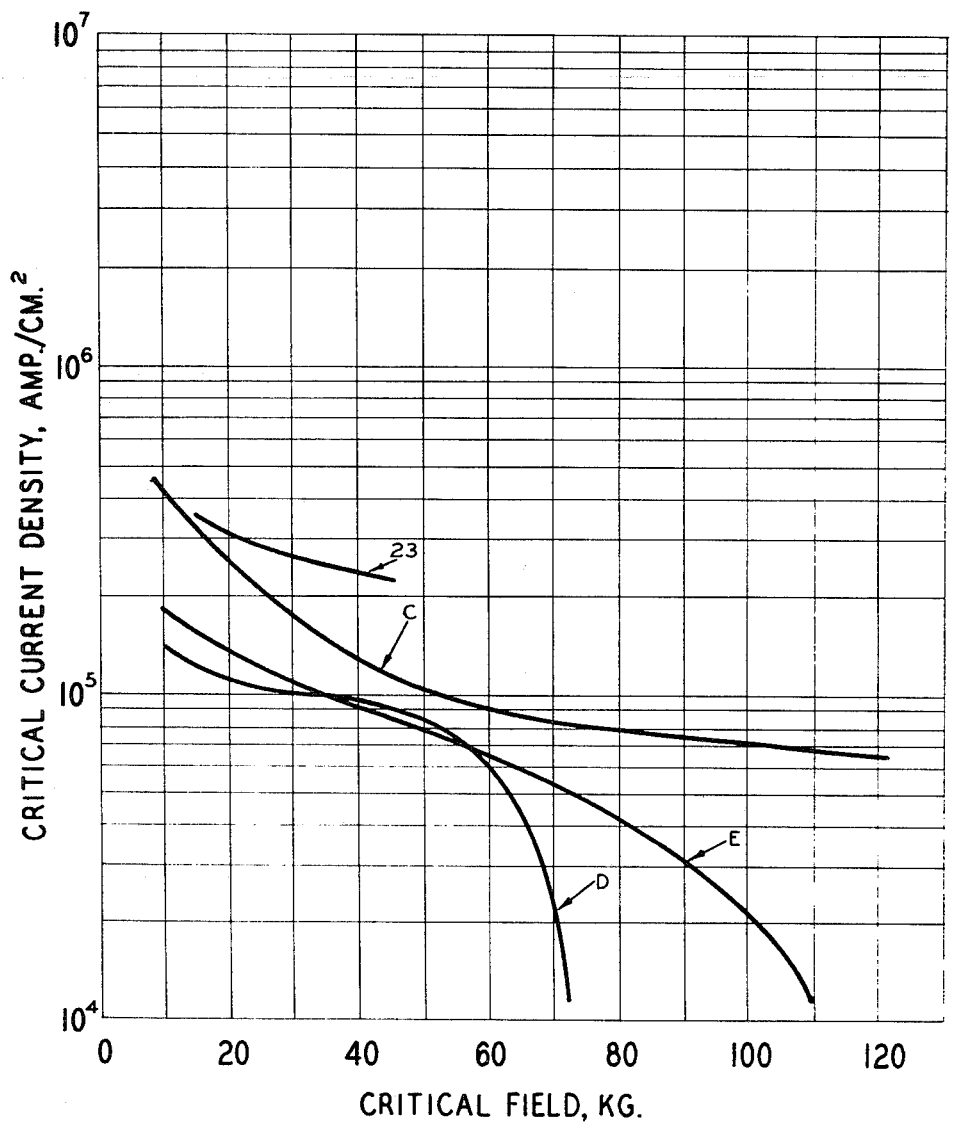

FIG. 6 shows the critical current behavior for a structure containing the superconducting $\beta$-tungsten intermetallic compound, $NB_3Sn$, after the heat treatment specified in Table I, curve 23, compared with typical critical current behavior reported for $Nb_3Sn$ wire, curve C, Nb-25 percent Zr wire, curve D, and Nb-40 percent Ti wire, curve E.

The comparative curves in the figures indicate the relatively high current densities that are attainable in structures produced according to this invention at relatively high magnetic fields. In general, the current-field characteristics of the structures of this invention are at least as good as have been attained on material produced by any other method, and sometimes are superior to the latter.

The intervening nonsuperconducting layers are preferably a composite comprising a highly normally conductive material such as copper and an electrical insulator such as refractory material like alumina. The copper component serves two important purposes. It acts as a local shunt and flux motion damper for the adjacent superconducting layers and also acts as a means for dissipating stored magnetic energy in the magnet should a normalcy occur in the superconductive layers. The alumina component electrically insulates adjacent superconducting layers. In known wire wound magnets, the wire has a copper cladding for shunting and energy dissipation. The thicknesses of the copper and alumina components may be on the order of 3 mils and 0.5–1.5 mils, respectively, for example. Alumina is a preferred material because it easily tolerates the conditions for heat treatment that the superconducting layers may undergo and easily tolerates thermal cycling between 500 °K and 4.2 °K. Titania, zirconia and other refractory dielectrics would also be suitable. Both components of the intervening layers are preferably formed from material that can be plasma deposited by introducing powder into the plasma since plasma deposition is preferred for forming the superconducting layers.

Figure 7A:
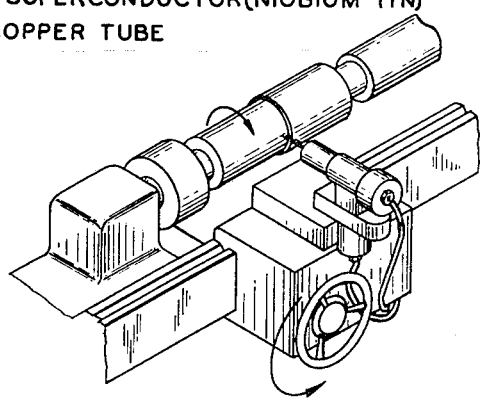
FIGS. 7a–7d illustrate steps which may be employed to fabricate a helical magnet in accordance with this invention.
Figure 7B:
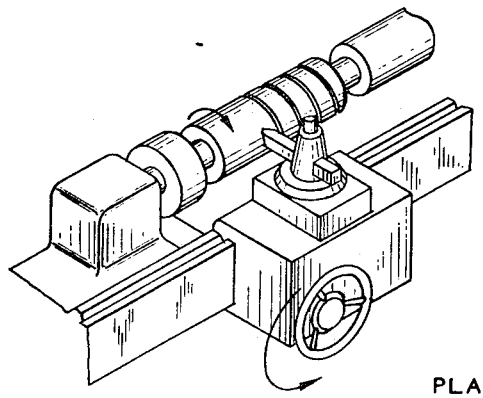
Figure 7C:
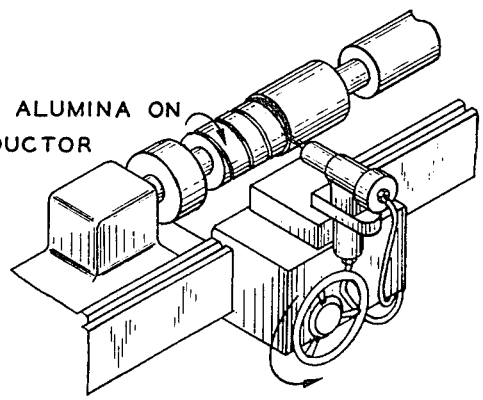
Figure 7D:
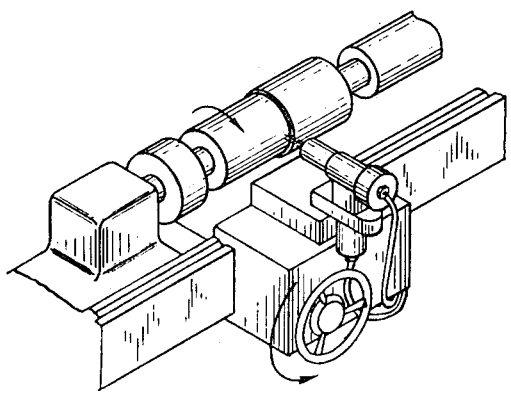
Figure 8:
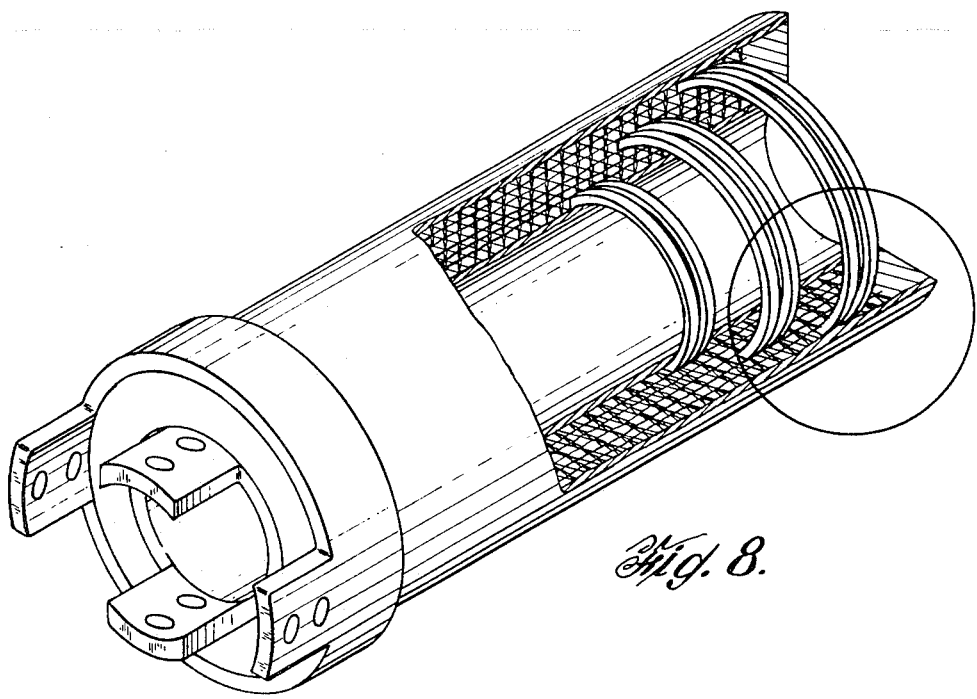
FIG. 8 is an isometric view, partially in cross-section of a helical magnet fabricated in accordance with this invention.

FIGS. 7a–7d depict the preferred steps in fabricating a cylindrical magnet in accordance with this invention and FIG. 8 depicts a partial cross-section of the finished magnet.

Because of the cylindrical symmetry, a rotating copper mandrel is employed as the base. As shown in FIG. 7a, a layer of superconducting material is deposited onto the copper base. Since the copper base is to constitute one of the two current contacts in the finished magnet, the plasma deposition process described previously is preferred because that process permits the formation of a good bond, and therefore good electrical conductivity, between the base and the first-deposited superconducting layer. Simultaneous with the rotation of the copper mandrel, the plasma deposition apparatus is advanced from one end of the mandrel to its other end at a suitable rate to attain a superconducting layer of uniform thickness.

As shown in FIG. 7b, the superconducting layer formed as shown in FIG. 7a is machined to form a helical current path in the form of a continuous thread. The maching tool would ordinarily have a pointed tip so that the resulting thread windings would be separated by V-shaped grooves. As an example, a 6 inch I.D., 12 inch long, 100-K-gauss magnet formed of $Nb_3Sn$ might require a 600-mil$^2$, 300-amps. conductor in the first-deposited superconducting layer and that layer would therefore be about 20 mils thick and the thread windings would be 23 mils wide at the top and 37 mils wide at the base and the intervening grooves would be 15 mils wide at the top and 1 mil wide at the base. A short length (perhaps three-eighths inch depending on the design current) of the superconducting layer deposited as shown in FIG. 7a would be left ungrooved at one end of the mandrel to provide a region which will become the electrical contact between that layer and the next superconducting layer deposited.

As shown in FIG. 7c, the grooved superconducting layer formed as per FIGS. 7a and 7b is then covered with a layer of alumina insulation of sufficient thickness to electrically isolate the superconducting thread-like current path from the copper layer to be applied in the next step (FIG. 7d). The step shown in FIG. 7c will produce a somewhat wavy surface of alumina. It should be noted that alumina is a preferred material because it can be conveniently deposited by the same plasma deposition apparatus used in FIG. 7a by introducing alumina powder into the plasma in the manner previously described with reference to depositing layers of superconducting material. As the mandrel rotates, the deposition apparatus moves from one end of the mandrel to its other end to produce an alumina layer that completely covers the superconducting thread-like current path, including the grooves between adjacent windings of the thread, formed as shown in FIG. 7b. The ungrooved end portion, however, is not covered with the alumina layer since that portion constitutes a current contact with the next superconducting layer to be deposited.

As shown in FIG. 7d, the alumina-coated device formed as per FIGS. 7a–7c is coated with a copper layer of sufficient thickness to fill the valleys in the alumina layer and cover the peaks to a depth of approximately 3 mils. This copper layer may also be deposited by the plasma deposition apparatus used in the steps shown in FIGS. 7a and 7c by introducing copper powder into the plasma. This copper layer is then machined to an even cylindrical surface preparatory to deposition of the next superconducting layer. The exposed ungrooved region of the first-deposited superconducting layer is not covered with the copper layer so that the next super-conducting layer will make direct contact with the first-deposited layer.

Steps 1 to 4 as shown in FIGS. 7a–7d are repeated for each subsequent superconducting layer deposited until the required number of layers are reached. The current contacts at the ungrooved end of the previously deposited layers makes an essentially perfect superconducting joint; no interface between adjacent superconducting layers can be detected at this region. It should be noted that this layer-to-layer current contact alternates from one end of the magnet to the other as each pair of adjacent superconducting layers are formed so that the current will pass helically through one layer in one longitudinally oriented direction and helically back through the next adjacent layer in the opposite longitudinally oriented direction. This alternate-end current contact is shown in FIGS. 8 and 8a.

Figure 8A:
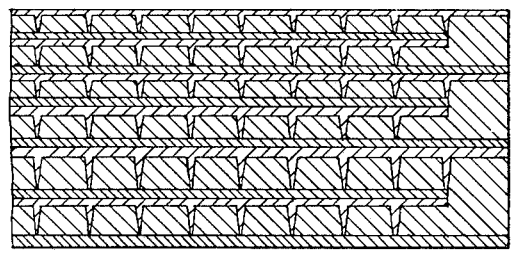
FIG. 8a is an enlargement of the area circled in FIG. 8.

It will be obvious to those skilled in the art that while FIGS. 8 and 8a show a preferred embodiment wherein the superconductivity spiral layers are in series arrangement it is possible to provide the spiral layers in a parallel or combination of series and parallel arrangement the important criterion in any arrangement being that the magnetic fields by additive.

The final layer of copper on the outer periphery is made thicker than the other layers and constitutes the second current lead. This outer or final layer is joined to the copper normal contacts as shown in FIG. 8.

If a persistent current switch is to be incorporated into the magnet, the material forming the switch could be sprayed onto a suitable substrate across one end of the magnet such that it would join the innermost and outermost superconducting layers. This switch, together with its heater, would be surrounded by a thermally insulating material.

The stresses encountered in the operation of superconducting magnets are a major design factor. First of all, the coil materials must be able to withstand the stresses of differential expansion and contraction induced by thermal gradients encountered in repeated thermal cycling between room temperatures and liquid helium temperatures. Plasma-plated superconductors are stable to such temperature cycling.

A primary concern is the tremendous "hoop stress" exerted by the magnetic pressure on the coil during operation. These stresses act in a manner akin to those exerted by a hydraulic fluid under high pressure on a contaminant vessel, i.e., they try to expand the coil radially. In a 100 Kgauss, 6-in. diameter coil, these forces can cause as much as 25,000 psi tensile stress on the windings. A compressive axial force also exists. In wire or strip-wound coils the aniosotropic nature of these forces can cause serious slippage of conductors. Even slight relative motion of conductors can cause premature normalcies (loss of the superconduction property) and, of course, if slippage is excessive, mechanical integrity of the coil is lost.

An additional important factor is the tremendous disruptive influence on the coil exerted by a rapidly collapsing field after a normalcy. If sufficient normally conductive material is not closely coupled to the superconductive inductance so as to dampen the field collapse, the energy dissipation can occur in the form of a very damaging shock wave. Large (1 in. D. × 6 in. long) unconstrained and uncoupled sintered niobium tin tubes have been shown to literally explode during momentary normal transitions induced by flux jumps at fields as low as 45 Kgauss.

In general, large coils should be designed so that normalcies will never occur during operation, thus avoiding the field collapse stresses and wastage of large quantities of liquid helium. It is usually necessary, however, to design for the eventually of repeated normalcies.

The technique of coil fabrication depicted in FIGS. 7a–7d and 8 discussed above allows the incorporation of layers of copper between each layer of "windings." As indicated above, these copper layers serve several functions, one of which is to slow the field collapse and lessen the stresses induced by normalcies. FIGS. 8 and 8a also show how the cross-section of the coil can be formed into a dense, solid body without voids which might allow local deformation. It is not likely, however, that even this desirable situation can withstand the stresses of high magnetic field containment. The need for high packing factors results in maximizing the quantity of superconducting material per unit area of the coil cross-section and this material is not sufficiently strong by itself to contain the field. Table II shows typical measured strength and density values for plasma deposited niobium tin.

TABLE II

| Density (g.cc.) | Modulus of Rupture (psi) | Modulus of Elasticity (psi) |
|---|---|---|
| theoretical — 8.9 | as-plated — 34,000 | as-plated — 7.5 × $10^6$ |
| actual — 7.2 | heat-treated — 20,000 | heat-treated — 3.3 × $10^6$ |

Fortunately, this problem can be overcome by incorporating external constraints into the coil design. Although not shown in FIG. 8, any coil of that type would probably be enclosed (except for access holes) in a shrink-fitted or mechanically fastened constraining cylinder with annular ends made from titanium or stainless steel. Since all stresses are outward from the working volume and since the body of the coil is dense and void-free, this method is a simple means of preventing coil disruption, conductor slippage and excessive tensile stresses on the relatively brittle superconductor. It has the important additional advantage of placing the force-supporting material completely external to the "windings" so that no sacrifice in packing factor is needed. Finally, an incidental benefit accrues from the fact that the constraining cylinder can be closely coupled to the coil inductance and represents a further dampening influence on any field collapse.

The magnet configuration shown in FIG. 8 results in the conductors of each layer shorted together by the copper in a manner analogous to that achieved by the use of copper-plated wire or strip. The alumina is employed in such a manner as to prevent direct electrical contact between the copper or superconducting layers except at alternating opposite ends so as to avoid excessively long time constants for charging the coil.

Table III shows the approximate dimensions, weight of superconductor and the number of layers required for $Nb_3Sn$ coils assuming a 300-ampere design current (an average super-conductor cross-section area of 600 mils$^2$) a packing factor of 0.5 and a minimum current density of 7 × $10^4$ amp./cm.$^2$ at 100 Kgauss.

TABLE III

| Coil I.D. (in.) | Field strength at 4.2° K. (kg.) | Homogeneity | "Winding" O.D. (in.) | "Winding" length (in.) | Wt. of niobium tin (in.) | No. of layers |
|---|---|---|---|---|---|---|
| 1 | 100 | 1% in 1-in. sphere | 3 | 5 | 5 | 32 |
| 2 | 100 | 1% in 2-in. sphere | 4 | 9.2 | 12 | 32 |
| 6 | 80 | 8% in 2-in. sphere | 8.5 | 5.2 | 24 | 40 |
| 18 | 50 | 2% in 2-in. sphere | 20.5 | 7.2 | 80 | 40 |

In addition to the fabrication of helical coils, described herein above, this invention is applicable to the fabrication of superconducting coils of other shapes and geometries. Irrespective of the specific configuration or geometry, a magnet fabricated according to this invention consists of superimposed layers containing superconducting material alternating with layers containing non-superconducting material where each superconducting layer in succession partially overlaps a boundary of the preceding superconducting layer adjacent thereto to form superconducting joints at alternate boundaries such that adjacent superconducting layers are serially connected to define a continuous superconducting path. The non-superconducting layers completely separate adjacent superconducting layers other than at the overlaid boundaries.

Figure 9:
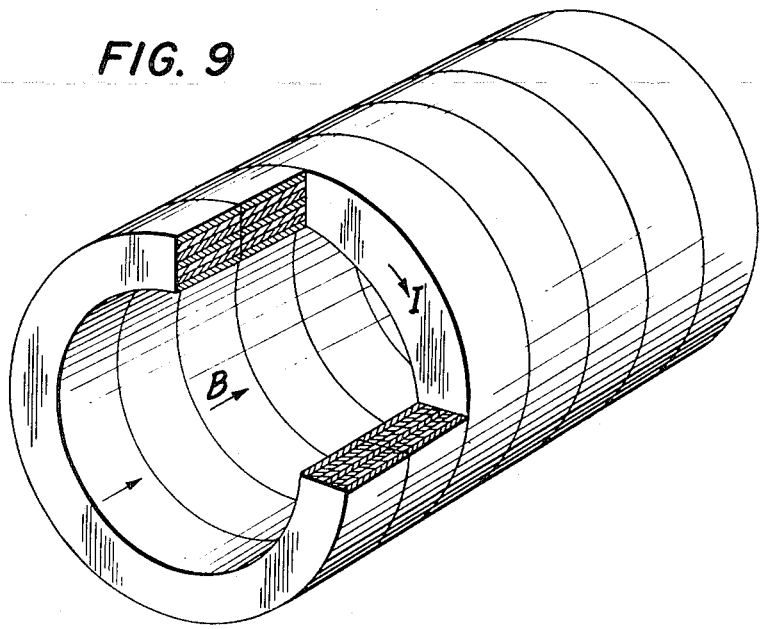
FIG. 9 is an isometric view partially in cross-section of a pancake type coil configuration fabricated in accordance with this invention.

The helical magnet configuration, the construction of which is illustrated in FIGS. 7a–7d, is an axisymmetric coil which generates a magnetic field parallel to the axis of the cylindrical volume defined by the helix. Another axisymmetric coil configuration which will generate a magnetic field parallel to the working volume is the "spiral wrap coil." A spiral wrap coil is formed by spirally depositing the superimposed layers about a substrate generating a structure similar in appearance to a coil formed of a spiral wound conducting sheet or tape. Where the spiral is of rather narrow width, its general appearance will be similar to that of a "pancake." For this reason, the word pancake has been adopted to signify such an assembly and will be hereinafter referred to as such. When a number of such pancake coil assemblies are positioned contiguous to one another in coaxial relationship, as shown isometrically in FIG. 9, a magnetic field will be generated like that of a helical coil of the same overall size and shape. Pancake coils may have certain fabrication and operational advantages over the helical coil design. For example, plasma plating of pancake coils has been found to be more straight forward and less costly than the plating of the helical coil. Moreover, the ability to separate the pancakes slightly in order to permit good liquid helium circulation has been found to give the pancake assembly better operational characteristics, e.g., greater stability than its more massive helical coil counterpart.

For certain magnet applications such as in magnetohydrodynamic power generation, it is desirable that the magnetic field be perpendicular to the working volume which may be of cylindrical, rectangular or conical (truncated) configuration, having a large length to breadth ratio. Two sets of helical or pancake coils operating as a spaced pair can be made to generate a field perpendicular to the working volume of any of the above configurations by locating the working volume between the spaced pair. However, such an arrangement would be inefficient for working volumes of large length to breadth ratios since the coils would necessarily have to generate a field over a volume much larger than that occupied by the working volume. It is therefore preferable to shape the superimposed layers closely about the working volume and to direct the current path so that the generated field will be perpendicular. Distinct sets of superimposed layers may be symmetrically disposed about the surface either as a dipole coil or as a quadrapole coil configuration. Coil configurations which have been specifically developed for the purposes of efficiently generating homogeneous fields perpendicular to the working volume are dipole coils of "race track" or "saddle" type geometry. The terms "race track" and "saddle" stem from the positioning and peculiar geometry of the winding turnarounds of the superimposed layers at the ends of the coils. Those turnarounds join the linear parallel conductor sections which are parallel to the axis of the working volume generating a magnetic field perpendicular to this volume. Such coils are positioned and shaped so that they do not cut across the working volume. The working volume for the purpose of this disclosure is intended to include cylindrical, rectangular or conical geometries, and may be representative of the substrate upon which the coil or coils are formed or may represent a volume in which a directional magnetic field is to be generated.

Typically two race track or two saddle coils will be operated as a pair. With fields aiding they generate a homogeneous field suitable for magnetohydrodynamic (MHD) applications. With fields opposing the pair generates a two dimensional cusp field (quadrapole field) which when added to a field transverse to the cusp field (mirror coil field) results in a centrally located minimum field region suitable for suppressing flute instabilities in a plasma.

Figure 10:
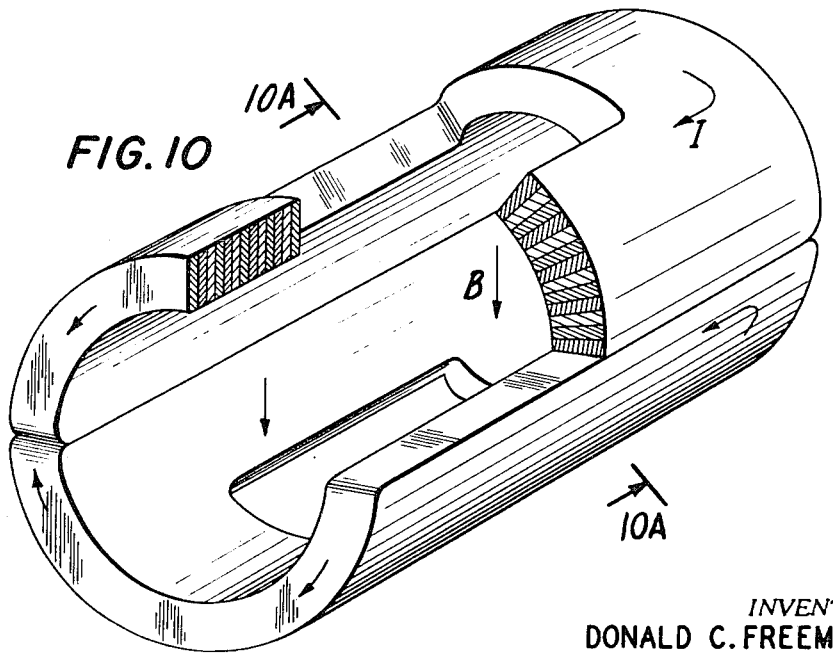
FIG. 10 is an isometric view partially in cross-section of a saddle type coil configuration fabricated in accordance with this invention.

FIG. 10 is an isometric view, partially in cross-section, of a typical pair of saddle coils symmetrically positioned about the surface of a cylindrically shaped substrate. Each set of superimposed layers is of substantially elliptical geometry with the major axis of each ellipse in parallel to the longitudinal axis of the cylindrical volume. With current flowing through the superimposed layers of each saddle coil in the direction as shown by the arrows in FIG. 10, a magnetic field is generated in a direction perpendicular to the cylindrical volume. The magnetic field vectors are identified by the letter B. FIG. 10a is a cross-sectional view taken along the lines 10a, 10a of FIG. 10. A dot enclosed by a circle signifies current flowing out of the plane of the paper while a circle enclosing a cross signifies current flowing into the plane of the paper. The superimposed layers of each saddle coil consist of superconducting layers alternating with non-superconducting layers where each superconducting layer is connected to each other at alternate ends to define a continuous superconducting path. The manner in which the layers are deposited is exemplified in FIG. 11. FIG. 11 shows a typical race track coil configuration where each layer is spirally wrapped or deposited about a substantially rectangular substrate. Each superconducting layer partially overlaps each preceding superconducting layer to form superconducting joints resulting in a continuous superconducting path. FIG. 11A shows a pair of race track coils abutting a cylindrical working volume. The race track coils are shown in cross-section with current flowing into and out of each set as indicated by the encircled dot and cross. The current generates a magnetic field which as indicated by the arrow in FIG. 11A is transverse to the working volume. In a practical magnetohydrodynamic application, the working volume may represent the exhaust duct of an oxy-fuel combustor.

The preferred procedure for fabricating a race track coil in accordance with the invention is hereafter described in connection with FIGS. 12, 12A and 11.

FIG. 12 depicts a typical substantially rectangular substrate for a race track coil in position with respect to the deposition apparatus. The apparatus is mounted on a traversed mechanism (not shown) capable of two dimensional motion while the substrate rotates about its axis. The deposition apparatus and substrate motions are adjusted and coordinated so that the required coating thickness can be laid down in one revolution of the substrate. The deposition apparatus preferably consists of an arc torch of the type shown and described in U. S. Pat. No. 3,016,447 for plasma depositing each layer as hereinbefore described in connection with the helical coil. Proper attention to the coating parameters permits attainment of the required continuous laminar structure in the superconductor coating.

As is the case with the helical coil, it is common to utilize a series multi-conductor design with either the race track or saddle coil in order to generate high intensity magnetic fields with moderate currents. The preferred approach to building a multi-conductor race track or saddle coil is to coat a spiral wrap configuration. FIG. 11 is a typical example of a three turn race track coil plated in the following manner.

A copper substrate (mandrel) of the type shown in FIG. 12 is fixed to a spindle (not shown) which rotates it slowly in front of the coating apparatus.

Alumina powder is fed through the coating apparatus and a full width, 0.004 inch thick coating is laid down as shown in FIG. 12a by rapidly oscillating the apparatus in the direction parallel to the substrate's axis of rotation, while the substrate rotates and the apparatus maintains the desired standoff. The alumina coating serves as an insulator. Other electrical insulator materials could be used in place of alumina. Before the substrate has rotated a full 360° the powder feed is halted and a gap of approximately 1 inch is left in the coating. This gap defines the electrical contact area between the copper substrate, which serves as the inner current terminal, and the first layer of superconductor.

The coating apparatus is indexed over one-half-inch in preparation for starting the superconductor coating at a point midway in the contact area. Superconductor powder such as Nb-Sn is fed into the apparatus and the relative motions are adjusted so that a 0.004 inch superconductor layer is deposited. A good mechanical and electrical bond is formed between the copper substrate and the superconducting material in the contact area. Again the powder feed is halted before the substrate has made a full revolution, leaving a 1-inch gap in the superconductor coating.

The apparatus is indexed one-half-inch and a normal metal is coated to a thickness of 0.004-inches, with a 1-inch gap left in the coating. At the completion of this first normal metal coating there should be no electrical contact between the beginning of either the superconductor or normal metal coating and the end of the superconductor or normal coating. Any such contact would constitute a "shorted turn." If overspray has shorted the turn it can usually be quickly removed with a light grit blast.

After indexing one-half-inch the three materials — insulator, superconductor and normal metal are again coated in sequence. Care must be taken that the one-half-inch indexing is performed after every layer is coated and that at least a 1-inch gap is left in each single coating. It is obvious that different coil designs can call for different gaps and indexes, the important factor is that the gap be large enough to prevent shorting of the turn.

The above sequence can be repeated indefinitely or, more realistically, till the required number of turns have been deposited. The final layer could be a normal metal if current leads are to be soldered directly to the coil, or a superconductor layer if a persistant switch is to be incorporated into the circuit.

It will be obvious to those skilled in the art that the race track coil configuration reduces to an axisymmetric "pancake" coil configuration when the length of the linear portion of the conductor reduces to zero. Thus the above steps also are applicable to the fabrication of "pancake" coils with a spiral wrap conductor configuration. The saddle coil is fabricated in a manner similar to the race track coil. The difference resides only in the physical manipulation of the coating apparatus with respect to the substrate.

During the actual plating of the race track or saddle coil no machining operations are required provided care is taken that no individual layer is completed, i.e. shorted on itself. Once the coil is plated it is usually necessary to machine the side walls of multi-layer coils, in order to remove excess material that may bridge over the insulation between layers.

Despite their non-axisymmetric geometries, the coated race track and saddle coils have the same criteria for successful operation as do the cylindrical solenoids. The superconductor performs according to the same current density vs. magnetic field relationship whether the coil by axisymmetric or saddle shaped. The need to incorporate a good normal conductor, e.g., copper, and reliable insulator, e.g., alumina, remain. There is also the need to deal with the very large forces (Lorentz forces) resulting from the interaction of current and generated magnetic field. In the case of the race track and saddle coils, which by reason of their linear parallel conducting sections are not as nearly self-supporting as the cylindrical, axisymmetric helical coil, it is necessary to utilize a more substantial support structure to give the parallel conductors the necessary strength. As with the axisymmetric coils an external well placed constraint is sufficient, no internal support members are necessary because of the dense, rigid nature of the coated magnets.

What is claimed is:

1. A method of forming a superconducting magnet composed of a plurality of superconducting layers alternating with nonsuperconducting layers comprising the steps of:
   a. depositing a first layer of superconducting material, having a structure of microscopic metallic particles bonded into interlocking relation with one another with the interface between bonded particles forming a continuous matrix of metallic material having superconducting properties, upon a substrate;
   b. machining the coated superconducting layer longitudinally from one end of said substrate to a predetermined position adjacent the opposite end such as to develop about said substrate a helically wound continuum of thin superconductive strip material;
   c. depositing thereupon a layer of nonsuperconducting material from said one end to said predetermined position at the opposite end;
d. depositing a second superconducting layer, having the same structure as said first layer, upon the coated surface of the substrate such that the second layer is superimposed upon the nonsuperconducting layer and the region of the first superconducting layer extending from said predetermined position;
e. and machining said second superconducting layer in the opposite longitudinal direction up until another predetermined position to form an oppositely wound helical continuum of thin superconductive strip material, and cyclically repeating the steps (a), (b), (c), (d), and (e) until a plurality of helices of superconducting material are forward with alternating overlapping superconducting ends.

2. A method according to claim 1 wherein each deposition step is carried out by striking an electric arc between two electrodes, passing a gas stream into the arc to produce a high thermal content plasma, and introducing into said plasma powdered particles.

3. A method according to claim 2 wherein the superconductive layers are formed by introducing into the plasma metallic particles which are selected from the class consisting of niobium, niobium and tin, niobium and aluminum, niobium and zirconium, niobium and titanium, and vanadium and silcon.

4. A method according to claim 3 wherein each nonsuperconductive layer is formed by depositing first an insulating layer and then a normally conductive layer upon said insulating layer such that the combined layers separate successive superconducting layers other than at the overlaid ends of said superconducting layers.

5. A method according to claim 4 wherein the insulating layer is composed of a refractory material and wherein said normally conductive layer is composed of a material selected from the class consisting of copper and aluminum.

6. A method of forming a superconducting magnet composed of a plurality of superconducting layers alternating with nonsuperconducting layers comprising the steps of:
a. introducing a suitable powdered metallic superconducting material into a high velocity arc plasma;
b. directing said metallic powder entrained arc plasma toward a substrate;
c. establishing relative motion between said substrate and said metallic powder entrained arc plasma to circumferentially deposit a first superconducting layer of said metallic powder about the periphery of said substrate;
d. stopping said deposition of said metallic powder so as to leave a gap in said first superconducting layer;
e. indexing said substrate relative to said arc plasma;
f. introducing nonsuperconducting powdered metallic material into said high velocity high thermal content arc plasma;
g. depositing said nonsuperconducting powdered metallic material into said gap and over said deposited superconducting layer;
h. stopping the deposition of said nonsuperconducting powdered metallic material so as to leave a gap in said nonsuperconducting layer and to expose a portion of the underlying superconducting layer;
i. repeating steps (a) and (b);
j. depositing a second superconducting layer into said gap and over said deposited nonsuperconducting layer;
k. stopping the deposition of said second superconducting layer so as to leave a gap therein and to expose a portion of the underlying nonsuperconducting layer; and
l. repeating steps (e) through (k) in cyclic manner until said plurality of layers are formed.

7. A method according to claim 6 wherein the superconductive layers are formed by introducing into the plasma metallic particles which are selected from the class consisting of niobium, niobium and tin, niobium and aluminum, niobium and zirconium, niobium and titanium, and vanadium and silcon.

8. A method according to claim 7 wherein each nonsuperconducting layer is formed by depositing first an insulating layer and then a normally conductive layer upon said insulating layer such that the combined layers separate successive superconducting layers. Other than at the overlaid ends of said superconducting layers.

9. A method according to claim 8 wherein the insulating layer is composed of a refractory material and wherein said normally conductive layer is composed of a material selected from the class consisting of copper and aluminum.

* * * * *